R. J. MILLION.
TRACTOR.
APPLICATION FILED APR. 28, 1916.
1,230,752.
Patented June 19, 1917.
2 SHEETS—SHEET 1.
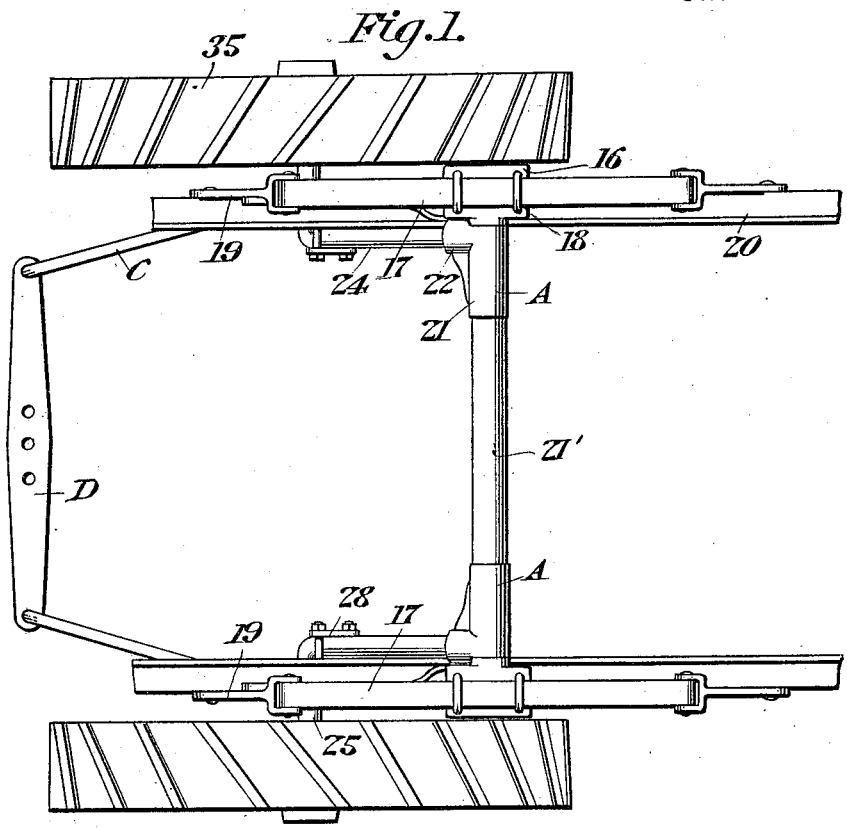
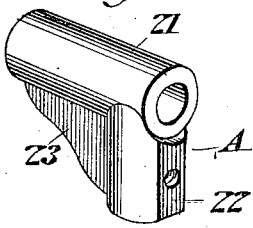
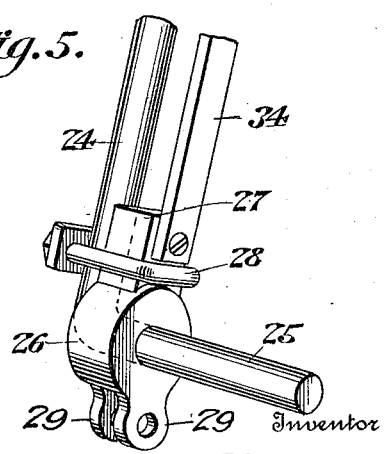
Witnesses
Inventor
Robert J. Million
By Victor J. Evans
Attorney

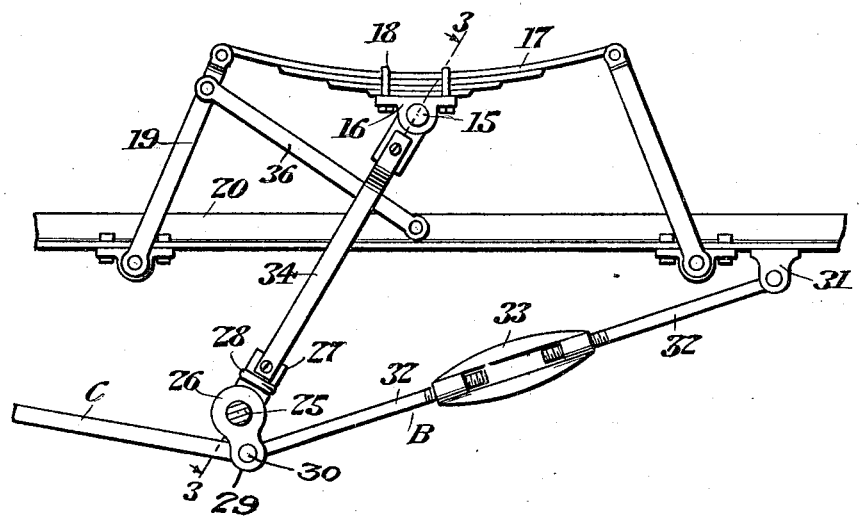
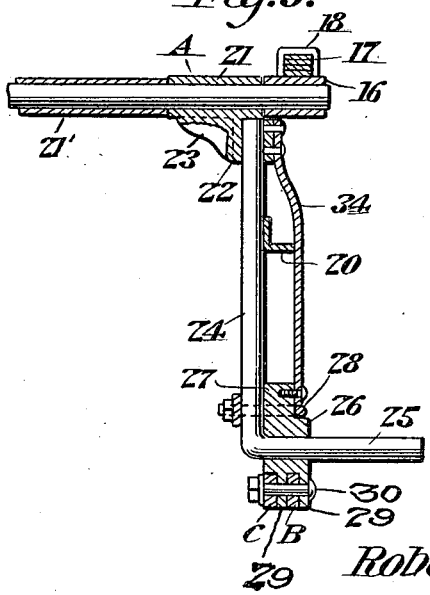

UNITED STATES PATENT OFFICE.

ROBERT J. MILLION, OF MONTICELLO, INDIANA.

TRACTOR.

1,230,752.      Specification of Letters Patent.      Patented June 19, 1917.

Application filed April 28, 1916. Serial No. 94,191.

*To all whom it may concern:*

Be it known that I, ROBERT J. MILLION, a citizen of the United States, residing at Monticello, in the county of White and State of Indiana, have invented new and useful Improvements in Tractors, of which the following is a specification.

This invention relates to tractors for agricultural use, and it has particular reference to an improved axle construction.

The invention has for its object to so connect the tractor wheels with the main axle in a simple and improved manner that the tractor wheels may be individually raised or lowered so that one of said tractor wheels may be permitted to run in the furrow and the other on the land when the tractor is used for the purpose of plowing.

A further object of the invention is to produce an improved construction whereby the main axle will be maintained at a desirable elevation to permit one of the plows to be hitched beneath the same, the tractor frame carrying the motor being spring supported with respect to the axle.

A further object of the invention is to simplify and improve the construction and arrangement of parts entering the construction of the improved device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view showing a portion of a tractor sufficient to illustrate the invention.

Fig. 2 is a side elevation of the same.

Fig. 3 is a transverse sectional view taken on the line 3—3 in Fig. 2.

Fig. 4 is a perspective detail view of one of the angle blocks.

Fig. 5 is a perspective detail view showing one of the blocks reinforcing the spindle and the arm carrying the same.

Corresponding parts in the several figures are denoted by like characters of reference.

The main axle 15 of the tractor is supported by means of blocks 16 which are secured at the ends of said axle, said blocks supporting the springs 17 which are connected therewith by clips 18. The ends of the springs are connected by links or shackle bars 19 with the side members 20 of the tractor frame.

Mounted for rotation on the axle 15 adjacent to the inner faces of the spring supporting blocks 16 are angle blocks A, each of which consists of a casting comprising two sleeves 21, 22, positioned substantially at right angles to each other and connected together by a strengthening and reinforcing web 23. The sleeve 21 of each angle block engages the axle 15, said sleeves being spaced by a spacing sleeve 21', and the sleeve 22 receives an arm 24 that extends radially with respect to the axle and which is terminally bent to produce a spindle 25. The arm 24 having the spindle 25 may be formed of shafting of suitable dimensions by properly bending the same, the arm 24 being forced or driven into the sleeve 22 where it is subsequently secured against rotation and endwise movement in any suitable well known manner.

For the purpose of reinforcing the spindle 25 with respect to the arm 24 a block 26 is used, said block having a tubular bore engaging the spindle, and said block having also a neck 27 affording a seat for a clip 28, whereby it is connected with the arm 24. In addition to reinforcing the spindle carrying arm the block 26 serves as a means for the attachment of the adjusting rod B and the draft rod C, said block being provided with lugs 29 for the passage of a pin, bolt or similar pivot member 30 whereby connection is made with the adjusting rod and with the draft rod. The adjusting rod B which connects the block 26 with a lug 31 on the side bar 20 of the frame comprises in its construction a pair of threaded members 32 and a turn buckle 33, whereby the length of the adjusting rod may be varied. Obviously an adjusting rod and a draft rod is used at each side of the frame structure so that the spindle carrying arms may be independently adjusted thereby. The draft rods C have been shown as being connected together by a transverse draft bar D which may be utilized for connecting the tractor with any vehicle or machine that is to be drawn thereby.

The reinforcing blocks 26 are connected with the angle blocks A by means of brace bars 34 between which and the spindle carrying arms 24 the frame bars 20 are included, thereby reinforcing the parts against lateral or swaying movement. The tractor wheels shown in outline by 35 are mounted in the customary manner on the spindles 25.

One of the shackle bars 19 is connected with the side member 20 by means of a brace 36 which, while preventing the shackle bars and the springs from lengthwise swinging movement, and virtually supporting one end of the spring against movement in any direction, will leave the other end of the spring free to operate when the spring is compressed or expanded.

From the foregoing description taken in connection with the drawings hereto annexed it will be readily seen that by lengthening or shortening the adjusting bar B, the tractor wheel at either side of the machine may be pulled forward and at the same time lowered so as to adapt such wheel to run in a plow furrow, while the other tractor wheel runs upon the land. The tractor will thus be peculiarly adapted for operating either a right hand or a left hand plow or a plurality of such plows, according to the relative dimensions of the tractor and the plows and according to the wishes of the operator. A very simple and efficient attachment is also provided. The parts that coöperate to produce an arched axle having independently adjustable spindle carrying arms are very simple and effective and have proven productive of excellent results.

Having thus described the invention, what is claimed as new, is:—

1. An axle, spring supporting blocks fixed thereon, springs mounted on the blocks, a tractor frame having side members, shackles connecting said side members with the springs, radial spindle carrying arms connected with the axle for rotation about the axis of said axle, and means for adjusting said spindle carrying arms and for securing them at various adjustments.

2. An axle, spring supporting blocks fixed at the ends thereof, a spacing sleeve on the axle intermediate said blocks, angle blocks mounted for rotation on the axle intermediate the spring supporting blocks and the spacing sleeve, said angle blocks having each an axle engaging sleeve and a second sleeve substantially at right angles thereto, and spindle carrying arms fixed in the last mentioned sleeves of the angle blocks.

3. An axle body, a spindle carrying arm, an angle block having sleeves substantially at right angles to each other engaging and assembling the axle body and the spindle carrying arm, one of said sleeves being in revoluble engagement with the axle body, and the spindle carrying arm being fixed in the other sleeve, a reinforcing member mounted in the spindle and connected with the arm carrying said spindle, and a brace connecting said reinforcing member with the angle block.

4. An axle body, a spindle carrying arm, an angle block having sleeves substantially at right angles to each other engaging and assembling the axle body and the spindle carrying arm, one of said sleeves being in revoluble engagement with the axle body, and the spindle carrying arm being fixed in the other sleeve, a reinforcing member mounted in the spindle and connected with the arm carrying said spindle, and a brace connecting said reinforcing member with the angle block, in combination with a tractor frame, each side member of which is included between a spindle carrying arm and the last mentioned brace.

5. An axle body, radially disposed arms supported for rotation about the axis of the axle body, each of said arms having a spindle at its outer end, reinforcing members having bores engaging the spindles, each reinforcing member being provided with an upwardly extending neck and with downwardly extending lugs, and clips connecting the reinforcing members with the radial arms.

6. An axle body, radially disposed arms supported for rotation about the axis of the axle body, each of said arms having a spindle at its outer end, reinforcing members having bores engaging the spindles, each reinforcing member being provided with an upwardly extending neck and with downwardly extending lugs, and clips connecting the reinforcing members with the radial arms, in combination with a tractor frame having side members supported by the axle, and adjusting members whereby the reinforcing blocks are adjustably connected with the side members of the frame.

7. An axle body, radially disposed arms supported for rotation about the axis of the axle body, each of said arms having a spindle at its outer end, reinforcing members having bores engaging the spindles, each reinforcing member being provided with an upwardly extending neck and with downwardly extending lugs, and clips connecting the reinforcing members with the radial arms, in combination with a tractor frame having side members supported by the axle, and adjusting members whereby the reinforcing blocks are adjustably connected with the side members of the frame, said adjusting members comprising turn buckles and right and left threaded rods.

8. An axle body, radial spindle carrying arms swingingly connected therewith, reinforcing blocks having bores engaging the spindles, clips connecting the reinforcing blocks with the spindle carrying arms, a tractor frame, means including springs supporting the tractor frame relatively to the axle body, an adjusting rod connecting the reinforcing blocks adjustably with the side members of the tractor frame, and draft rods pivotally connected with the reinforcing blocks.

9. An axle, spring supporting blocks fixed thereon, springs mounted on the blocks, a tractor frame having side members, shackles connecting said side members with the springs, radial spindle carrying arms connected with the axle for rotation about the axis of said axle, and a brace connecting one shackle of each spring with a side member of the frame.

10. An axle, spring supporting blocks fixed thereon, springs mounted on the blocks, a tractor frame having side members, shackles connecting said side members with the springs, radial spindle carrying arms connected with the axle for rotation about the axis of said axle, a brace connecting one shackle of each spring with a side member of the frame, and means for adjusting the spindle carrying arms and for securing them at various adjustments.

In testimony whereof I affix my signature in presence of two witnesses.

ROBERT J. MILLION.

Witnesses:
GEORGE W. KASSABAUM,
JOSHUA D. FOWLER.

Copies of this patent may be obtained for five cents each, by addressing the "Commissioner of Patents, Washington, D. C."